United States Patent [19]

Tanemura et al.

[11] Patent Number: 4,849,383
[45] Date of Patent: Jul. 18, 1989

[54] BASIC REFRACTORY COMPOSITION

[75] Inventors: Fumikazu Tanemura; Toru Honda; Yoshiharu Kajita; Katsuhiko Kato; Keisuke Sakakibara, all of Aichi, Japan

[73] Assignee: Mino Yogyo Company, Ltd., Mizunami, Japan

[21] Appl. No.: 134,941

[22] Filed: Dec. 18, 1987

[30] Foreign Application Priority Data

Dec. 24, 1986 [JP] Japan ................. 61-310533

[51] Int. Cl.$^4$ ............................................. C04B 35/48
[52] U.S. Cl. .................................... 501/104; 501/103; 501/135
[58] Field of Search ...................... 501/103, 104, 135

[56] References Cited

U.S. PATENT DOCUMENTS 4,212,679  7/1980  Bonar ................................. 501/135

FOREIGN PATENT DOCUMENTS 2363354   6/1975  Fed. Rep. of Germany ...... 501/135
58-045168 3/1983  Japan ................................. 501/104
60-54971  3/1985  Japan .
0833859   5/1981  U.S.S.R. ............................. 501/104

Primary Examiner—William R. Dixon, Jr.
Assistant Examiner—Anthony J. Green
Attorney, Agent, or Firm—Hovey, Williams, Timmons & Collins

[57] ABSTRACT

A novel basic refractory composition is disclosed. This composition has high resistance to calcium silicates such as cement clinkers and slag formed in steelmaking operations. It also has superior resistance to thermal shock and stresses such as load in high temperature. A refractory brick produced from this composition can be used in the firing zone of a rotary kiln and successfully withstands cement firing operations for a significantly longer period than conventional refractory bricks.

The basic refractory composition consists of a synthetic calcium zirconate based clinker in combination with raw materials for magnesia; the molar ratio of CaO to $ZrO_2$ in said clinker is in the range of 0.5–1.1, at least part of said clinker being in the form of particles having a size not smaller than 0.5 mm, $ZrO_2$ being present in an amount of 4–49 wt % of said composition, the sum of CaO and MgO being 50–95 wt %, and the sum of $ZrO_2$, CaO and MgO being at least 80 wt %.

5 Claims, No Drawings

BASIC REFRACTORY COMPOSITION

BACKGROUND OF THE INVENTION

The present invention relates to a basic refractory composition that is particularly suitable for use in kilns and furnaces.

Magnesite-chrome, magnesia, magnesia-spinel, calcia, dolomite and magnesia-carbon have been used as conventional basic refractory compositons. These compositions are chiefly produced from natural and seawater magnesia clinkers, natural dolomite clinkers, synthetic magnesia-dolomite clinkers, calcia clinkers, chromite, spinel clinkers, natural graphite, etc. These materials, used either singularly or in admixture, are used as castable refractories or shaped refractories that may or may not be fired.

Various basic refractory compositions are used in sintering furnaces (e.g. rotary kilns), steelmaking ladles, secondary refining furnaces, converters and other melting furnaces depending upon the specific properties to be required of the refractory compositions, such as resistance to thermal spalling, resistance to erosion by molten metal, slag and cement clinkers, resistance to reaction with slag and cement clinkers and resistance to stresses such as load in high temperature.

In the firing zone of a rotary cement kiln, fired bricks are used, mostly in the form of magnesite-chrome bricks and magnesia spinel bricks and occasionally in the form of dolomite bricks. The first two types of fired bricks are designed to have quality that meets such requirements as resistance to erosion by cement materials, resistance to thermal spalling and the stability of coating adhering. Calcia bricks are unsuitable for use in the firing zone of a rotary cement kiln since they have a great tendency to be slaked by moisture absorption. Magnesia bricks are also unsuitable because of their poor resistance to thermal spalling. Magnesia carbon bricks are unuseful, too, since carbon is oxidized during extended use. Dolomite bricks have the advantage of consistency in coating adhering but, on the other hand, they are poor in resistance to thermal shock. Even commonly used magnesite-chrome bricks suffer from the disadvantage that the iron oxides present in chromite change from the divalent form to the trivalent form, or vice versa, during use, and that this reduces gradually the strength of the brick by destroying its structure. Magnesia-spinel bricks also have the defect in that the spinel clinker in the brick is easily decomposed as a result of reaction with raw cement materials, introducing instability in the adherence of cement coating. The prior art refractories used in rotary cement kilns have the aforementioned problems and there exists a need to further lengthen their service life.

SUMMARY OF THE INVENTION

An object, therefore, of the present invention is to provide a novel basic refractory composition that has superior properties such as high resistance to erosion by calcium silicates such as slag formed during steelmaking and cement clinkers. The refractory composition of the present invention is particularly suitable for use as a fired refractory brick in the firing zone of a rotary cement kiln without suffering from the aforementioned disadvantages of the prior art basic refractory bricks.

This object of the present invention can be attained by a basic refractory composition consisting of a synthetic calcium zirconate based clinker in combination with raw materials for magnesia, the molar ratio of CaO to $ZrO_2$ in said clinker being in the range of 0.5–1.1, at least part of said clinker being in the form of particles having a size not smaller than 0.5 mm, $ZrO_2$ being present in an amount of 4–49 wt % of the composition, the sum of CaO and MgO being 50–95 wt %, and the sum of $ZrO_2$, CaO and MgO being at least 80 wt %.

DETAILED DESCRIPTION OF THE INVENTION

The novel basic refractory composition of the present invention is produced by the following procedures: a calcia-containing material such as limestone or precipitated or ground calcium carbonate and a zirconia-containing material such as baddeleyite, partially stabilized zirconia or zircon are mixed in such proportions that the molar ratio of CaO to $ZrO_2$ is in the range of 0.5–1.1 and the mixture is either melted or shaped and sintered to provide a calcium zirconate based clinker; this clinker, as well as magnesia raw materials are conditioned to have a tranularity suitable for refractory bricks and a chemical composition characterized by 4–49 wt % $ZrO_2$, 50–95 wt % CaO+MgO and 80 wt % CaO+MgO+$ZrO_2$, provided that at least part of the synthetic calcium zirconate based clinker has particles not smaller than 0.5 mm in size. The present inventors have found that a refractory brick that is produced by shaping and firing said refractory composition in accordance with known techniques is free from the defects of the prior art basic refractories and exhibits superior characteristics.

During the use of this refractory brick, calcia produced from the calcium zirconate based clinker by decomposition dissolves in the liquid-phase component of a cement clinker so as to increase its viscosity and retard its penetration into the brick. At the same time, said calcia reacts with the liquid-phase component to form a calcia-rich product that resembles the cement clinker in composition and which promotes the adherence of cement coating on the brick. In addition, zirconia which is also produced from the calcium zirconate based clinker by decomposition does not easily wet with the liquid-phase component and proves to be satisfactorily resistant to erosion by the cement clinker. The fired refractory brick made from the basic refractory composition of the present invention has the additional advantage of high resistance to thermal shock on account of the low thermal expansion coefficient of the calcium zirconate based clinker as compared with conventional basic raw materials such as magnesia clinkers. Because of these features, the refractory brick produced by firing the basic refractory composition of the present invention is highly adapted for use as a refractory material in the firing zone of a rotary cement kiln and is free from the defects of magnesite-chrome bricks, magnesia-spinal bricks and dolomite bricks.

The criticality of the compositional range of the calcium zirconate based clinker used in the basic refractory composition of the present invention is described below.

If the molar ratio of CaO to $ZrO_2$ exceeds 1.1, free calcia will form and the properties of the clinker will become dominated by those of calcia. Therefore, the molar ratio should not exceed 1.1. At CaO/$ZrO_2$ molar ratios of 1.0 and 0.25, CaO.$ZrO_2$ and CaO.$4ZrO_2$ occur respectively, and molar ratios between these two values are obtained depending upon the mixing proportions of the two compounds. If the content of comparatively porous $CaO \cdot 4ZrO_2$ increases (viz., the molar ratio of CaO to $ZrO_2$ decreases), it becomes difficult to obtain a clinker in a densely sintered form and the resulting porous clinker has a relatively low degree of chemical stability. In addition, $CaO \cdot 4ZrO_2$ is highly acidic and renders the clinker vulnerable to the attack of a highly alkaline cement clinker. Therefore, the molar ratio of CaO to $ZrO_2$ must be at least 0.5, preferably at least 0.8.

Refractories are generally prepared from a mixture of coarse particles ($\geqq 0.5$ mm) and fine grains ($<0.5$ mm). The calcium zirconate based clinker defined above may be used either in the form of coarse particles or as a fine powder but, for the purposes of the present invention, it is more effective to use this clinker as coarse grains because this will help the basic refractory compositon of the present invention to exhibit its desired effects.

The advantage of employing the calcium zirconate based clinker which is substantially composed of coarse particles ($\geqq 0.5$ mm) is explained as follows: unlike magnesia clinker, the calcium zirconate based clinker exhibits such a behavior in expansion or contraction during thermal changes that it prevents excessive shrinkage and distributes internal stress during firing in the manufacture of refractory bricks or during the period of their service, and these phenomena contribute to improved performance in such aspects as brick's resistance to thermal spalling. An experiment conducted by the present inventors demonstrated that the resistance to thermal spalling of a fired refractory brick produced from the calcium zirconate based clinker was greater when it was substantially composed of coarse particles than when it was chiefly composed of fine grains smaller than 0.5 mm in size.

Therefore, it is important for the composition of the present invention that the calcium zirconate based clinker contains the highest proportion of particles having a size of 0.5 mm and more, and preferably at least 10% of said clinker is present as coarse particles ($\geqq 0.5$ mm) in the composition in an unshaped state.

However, if the basic refractory composition of the present invention is shaped and fired into a refractory brick, part of the calcium zirconate based clinker will react with silica and other impurities in the brick and migrate to grain boundaries, and this renders it extremely difficult to predetermine the quantity of particles in the brick that are larger than a certain value in grain size. The composition of the present invention may contain grains smaller than 0.5 mm in the calcium zirconate based clinker but, in order to ensure the aforementioned advantages of using grains of a size of 0.5 mm and greater, such coarse grains must be macroscopically observed in the composition.

The use of the calcium zirconate based clinker in the basic refractory compositon of the present invention is limited in such a way that the content of $ZrO_2$ in the composition is in the range of 4-49 wt %. If the $ZrO_2$ content of the composition is less than 4 wt %, the effectiveness of the calcium zirconate based clinker is not revealed and the resulting basic refractory composition displays properties similar to those of compositions that do not contain any of this clinker. Preferably, the $ZrO_2$ content is 6 wt % and more. If the $ZrO_2$ content exceeds 49 wt %, the objects of the present invention are not attained since the resulting basic refractory is quite inferior in terms of resistance to erosion by molten cement clinker and reacting with it. Preferably, the upper limit of the $ZrO_2$ is 40 wt % of the composition.

The combined amount of CaO and MgO, which are the two major components of the basic refractory composition of the present invention excepting $ZrO_2$, is also important for the purpose of attaining the advantages of the present invention and should be limited to be within the range of 50-95 wt % of the composition. If the sum of CaO and MgO is less than 50 wt %, the amounts of $ZrO_2$ and other components will increase to cause a substantial drop in the resistance of the resulting refractory composition to erosion by molten cement clinker and reaction therewith. Preferably, the sum of CaO and MgO is at least 59 wt % of the composition.

On the other hand, if the sum of CaO and MgO exceeds 95 wt %, the amount of $ZrO_2$ and, hence, of the calcium zirconate based clinker which characterizes the refractory composition of the present invention, is limited. Furthermore, the quantities of other components such as $SiO_2$ and $Fe_2O_3$ that can be incorporated in the industrial raw material for making the composition of the present invention are limited. As already pointed out, the advantage of using the calcium zirconate based clinker is not fully exhibited if the $ZrO_2$ content is limited. If the quantities of impurity components such as $SiO_2$ and $Fe_2O_3$ that can be incorporated in the raw material are limited, the basic refractory composition of the present invention becomes too expensive to be suitable for use in industrial applications. Therefore, the combined amount of CaO and MgO should not exceed 95 wt %, preferably not exceed 88 wt %, of the composition.

Any components other than CaO and $ZrO_2$ that are present in the calcium zirconate based clinker, and also any components other than CaO and MgO that are included in basic raw materials such as magnesia contribute to the decrease in the capabilities of the basic refractory composition of the present invention. Therefore, in accordance with the present invention, the combined amount of CaO, MgO and $ZrO_2$ is limited in such a way that it will not be smaller than 80 wt %, preferably not smaller than 90 wt %, of the refractory composition. If the sum of these three compounds is less than 80 wt % of the composition, a drop will occur in the resistance of the composition to erosion by molten cement clinker and reaction with it. Furthermore, a refractory brick that is produced by shaping and firing the composition will have too low a resistance to thermal shock to attain the objects of the present invention.

The following examples are provided for the purpose of further illustrating the basic refractory composition of the present invention but are in no way intended to be as limiting. All "parts" in the Examples are in a weight basis.

EXAMPLES

Synthesis of calcium zirconate based clinker

A mixture of the fine particles of baddeleyite (55 parts), zircon (5 parts) and limestone (40 parts) was shaped into the form of a standard straight brick, dried and fired at 1,750° C. in a tunnel kiln. The fired product was crushed into particles having a predetermined size distribution and they were used as a calcium zirconate based clinker.

Using this clinker, samples of the basic refractory composition of the present invention were prepared according to the formulations shown in Table 1. Comparative samples were also prepared according to the conventional formulations noted in Table 1. With a view to using these samples of basic refractory composition in the firing zone of a rotary cement kiln, 100 parts of the composition was mixed with 3 parts of waste pulp liquor as a binder. After kneading, the mixture was compressed into bricks with a hydraulic press at 1,000 kg/cm² and fied at 1,700° C. The characteristics of the bricks are summarized in Table 2. The evaluation of resistance to thermal shock was conducted by observing the development of cracks that occurred as a result of heat cycles each consisting of heating one surface of a refractory brick in an electric furnace held at 1,200° C. and cooling it with air. Resistance to erosion was evaluated by a rotary erosion testing method in which a mixture consisting of a cement clinker (80 parts), coal (10 parts) and potassium chloride (10 parts) was used as a slagging agent and the samples were heated at 1,800° C. for 5 hours. The degress of erosion and penetration by molten clinker were evaluated in terms of relative values, with those of comparative sample No. 4 being taken as 100.

Refractory bricks designated sample No. 1 (see Table 2) were used in the firing zone of a commercial NSP (new suspension preheater) rotary kiln (5.4 m$^\phi$) in the range of 6–12 m from the outlet of the kiln. These bricks successfully withstood cement firing operations for up to 9 months, which was a dramatic increase over the service life (3 months) of prior art sample No 4.

Refractory bricks designated sample No. 2 (see Table 2) were also used in the firing zone of a commercial NSP rotary kiln (4.7 m$^\phi$) in the range of 20–25 m from the outlet of the kiln. These bricks successfully withstood cement firing operations for up to 12 months, which was also a substantial increase over the service life (6 months) of prior art sample No. 6.

TABLE 1

| | | Formulation of Raw Materials | | | | | |
|---|---|---|---|---|---|---|---|
| | Particle size | Samples of the invention (parts) | | | Prior art samples (parts) | | |
| Components | (mm) | 1 | 2 | 3 | 4 | 5 | 6 |
| Calcium zirconate based clinker | 3–0.5 | 15 | 25 | 30 | | | |
| Calcium zirconate | ≦0.5 | 5 | 15 | 20 | | | |
| Seawater magnesia clinker | 3–0.5 | 25 | 15 | 10 | 25 | | 25 |
| Seawater magnesia clinker | ≦0.5 | 25 | 15 | 10 | 15 | | 15 |
| Seawater magnesia clinker | ≦0.074 | 30 | 30 | 30 | 30 | 29 | 30 |
| Synthetic magnesia dolomite clinker | 3–0.5 | | | | | 40 | |
| Synthetic magnesia dolomite clinker | ≦0.5 | | | | | 30 | |
| Bentonite | ≦0.01 | | | | | 1 | |
| Spinel clinker | 3–0.5 | | | 15 | | | |
| Spinel clinker | ≦0.5 | | | | 15 | | |
| Chromite | 3–0.5 | | | | | | 15 |
| Chromite | ≦0.5 | | | | | | 15 |
| Total | | 100 | 100 | 100 | 100 | 100 | 100 |

TABLE 2

| | Characteristic Values | | | | | |
|---|---|---|---|---|---|---|
| | Refractory bricks made from the composition of the invention | | | Prior art bricks | | |
| | 1 | 2 | 3 | 4 | 5 | 6 |
| Apparent porosity (%) | 15.7 | 15.6 | 14.9 | 16.1 | 16.5 | 16.9 |
| Water absorption (%) | 5.0 | 4.7 | 4.3 | 5.4 | 5.7 | 5.6 |
| Apparent specific gravity | 3.71 | 3.90 | 4.09 | 3.54 | 3.46 | 3.67 |
| Bulk density | 3.13 | 3.29 | 3.48 | 2.97 | 2.89 | 3.04 |
| Compressive strength (kgf/cm²) | 600 | 590 | 510 | 620 | 530 | 660 |
| Bending strength (kgf/cm²) | 47 | 59 | 68 | 35 | 41 | 40 |
| Resistance to thermal shock (cycles) | 20 no cracking | 20 no cracking | 20 few cracks | 20 few cracks | 5 spalled | 18 spalled |
| Resistance to erosion | | | | | | |
| wear index | 80 | 70 | 68 | 100 | 85 | 92 |
| penetration index | 92 | 79 | 71 | 100 | 81 | 94 |

As described on the foregoing pages, the basic refractory composition of the present invention can be used to manufacture refractory bricks that have high resistance to erosion and other features that render them highly suitable for use in the firing zone of a rotary cement kiln. It was experimentally confirmed that these bricks, when used in the firing zone of a commercial NSP kiln, successfully served for an appreciably longer period than conventional refractory bricks.

What is claimed is:

1. A basic refractory composition comprising a synthetic calcium zirconate based clinker having therein respective quantities of calcium oxide (CaO) and zirconium oxide (ZrO$_2$), in combination with magnesia (MgO), the molar ratio of CaO to ZrO$_2$ in said clinker being in the range of 0.5–1.1, at least 10 wt.% of said composition being in the form of clinker particles having a size not smaller than 0.5 mm prior to forming, the total combined weight percentage of the quantities of $ZrO_2$, CaO and MgO in the composition being at least 80 wt.%, $ZrO_2$ being present in an amount of 4–49 wt.% of said composition, and the sum of CaO and MgO being 50–95 wt.%.

2. A basic refractory composition according to claim 1 wherein the molar ratio of CaO to $ZrO_2$ in said clinker is in the range of 0.8–1.1.

3. A basic refractory composition according to claim 1 wherein the content of $ZrO_2$ is present in an amount in the range of 6–40 wt % of said composition.

4. A basic refractory composition according to claim 1 wherein the sum of CaO and MgO in said composition is in the range of 59–88 wt %.

5. A basic refractory composition according to claim 1 wherein the sum of CaO, MgO and $ZrO_2$ in said composition is at least 90 wt %.

* * * * *